Figure 1:
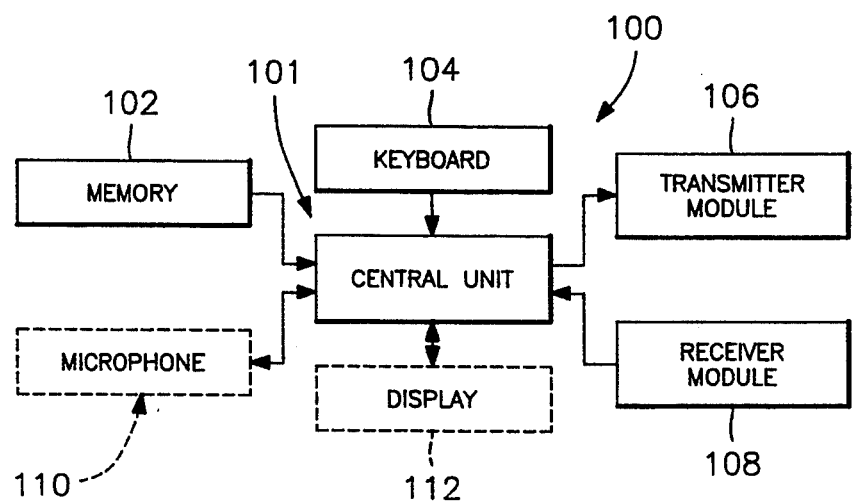

United States Patent [19]
Grasset

[11] Patent Number: 5,337,046
[45] Date of Patent: Aug. 9, 1994

[54] SYSTEM FOR COMMUNICATION BETWEEN PEDESTRIANS AND VEHICLES

[75] Inventor: Michel Grasset, Paris, France

[73] Assignee: Finance Techniques et Systemes, Paris, France

[21] Appl. No.: 920,328

[22] PCT Filed: Feb. 22, 1991

[86] PCT No.: PCT/FR91/00145
§ 371 Date: Aug. 24, 1992
§ 102(e) Date: Aug. 24, 1992

[87] PCT Pub. No.: WO83/01698
PCT Pub. Date: May 11, 1983

[30] Foreign Application Priority Data
Feb. 23, 1990 [FR] France .............................. 90 02264

[51] Int. Cl.$^5$ ............................................. G08G 1/095
[52] U.S. Cl. .................. 340/944; 340/825.49; 340/825.54; 455/54.2; 455/66
[58] Field of Search .............. 340/944, 988, 991–994, 340/825.3, 825.54, 825.69, 825.72, 825.49, 905; 342/457, 463; 455/38.1, 66, 54.2, 54.1, 89, 38.4; 364/436

[56] References Cited
U.S. PATENT DOCUMENTS
4,350,969 9/1982 Greer .................... 340/23
4,651,156 3/1987 Martinez ............... 342/457

FOREIGN PATENT DOCUMENTS
0296905 12/1988 European Pat. Off. .
0323326 7/1989 European Pat. Off. .
WO 83/01698 5/1983 France .

Primary Examiner—John K. Peng
Assistant Examiner—Tim Johnson
Attorney, Agent, or Firm—Jacobson, Price, Holman & Stern

[57] ABSTRACT

A vehicle pedestrian communication system including portable transmitting and receiving devices carried by the pedestrians, designed to generate request signals corresponding to the data related to the destinations desired by the pedestrians. The portable transmitting and receiving devices also designed to detect an acceptance signal from a vehicle. The system also comprises on-board transmitting and receiving devices for the vehicles designed to detect request signals generated by the portable transmitting and receiving devices and generate an acceptance signal for transmission to an inquiring pedestrian.

16 Claims, 12 Drawing Sheets

MICROCOMPUTER CARD

FOCUS 1

TRANSMITTER – RECEIVER

GEOGRAPHICAL BOOKLET

MICROCOMPUTER CARD

FOCUS 2

TRANSMITTER – RECEIVER

MICROCOMPUTER CARD READER

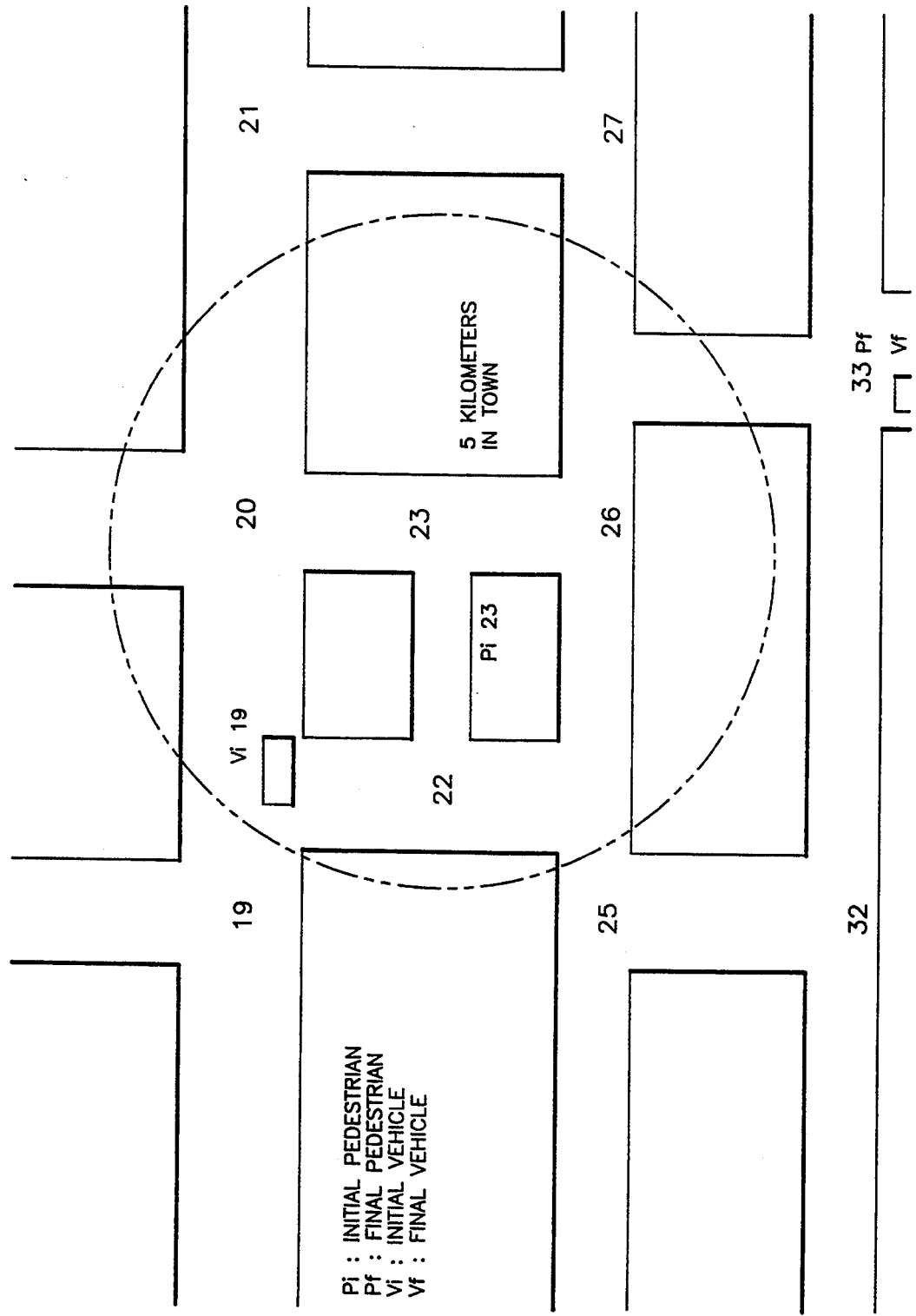

FOCUS 2 FUNCTIONAL FLOWCHART
CARD READER SUB-PHASE A

FOCUS 2 FUNCTIONAL FLOWCHART
CARD READER SUB-PHASE B

FOCUS 2 FUNCTIONAL FLOWCHART
CARD READER SUB-PHASE C

FOCUS 2 FUNCTIONAL FLOWCHART
CARD READER SUB-PHASE D

FOCUS 2 FUNCTIONAL FLOWCHART
CARD READER SUB-PHASE E

FOCUS 2 FUNCTIONAL FLOWCHART
CARD READER SUB-PHASE F

FOCUS 2 FUNCTIONAL FLOWCHART
CARD READER SUB-PHASE G

FOCUS 2 FUNCTIONAL FLOWCHART
CARD READER SUB-PHASE H

SYSTEM FOR COMMUNICATION BETWEEN PEDESTRIANS AND VEHICLES

The present invention relates to the field of the transport of people.

The object of the present invention is to propose novel means permitting contact to be made between, on the one hand, pedestrians wishing to go to a given place, and, on the other hand, vehicles capable of accommodating these pedestrians in order to transport them to the given place.

This object is achieved according to the present invention by virtue of a system comprising:

portable transmitter/receiver means carried by the pedestrians, designed to generate coded request signals whose code is representative of data relating to the trips wanted by the pedestrians and comprising, on the one hand, the identification of the destination wanted by the pedestrians and, on the other hand, the identification of the location of the pedestrians transmitting the request signals, and to automatically detect a possible pick up offer signal emanating from a vehicle, and transmitter/receiver means installed in vehicles, designed to detect the request signals generated by portable transmitter/receiver means whose code coincides with a specific code relating to the trip by each vehicle, and to generate a pick up offer signal in the event of coincidence between a code received originating from a portable transmitter/receiver means and the said specific code relating to the trip by the vehicle.

According to another characteristic of the invention said data relating to the trips wanted by the pedestrians comprise the definition of the route wanted.

According to another characteristic of the invention the said data relating to the trips wanted by the pedestrians comprise the identification of the directions wanted.

According to another characteristic of the invention, the portable transmitter/receiver means and the installed transmitter/receiver means, are designed to permit a dialogue between the pedestrians transmitting the request signals and the drivers of the vehicles transmitting the offer signals.

According to another characteristic of the invention, the system comprises means of identification of the pedestrians.

According to another characteristic of the invention, the system comprises means of identification of the vehicles and/or of their drivers.

According to another characteristic of the invention, the system comprises electronic payment means.

According to another characteristic of the invention, the electronic payment means comprise a memory medium held by the pedestrians, and a reading means for the memory medium, installed in the vehicles.

Figure 2:
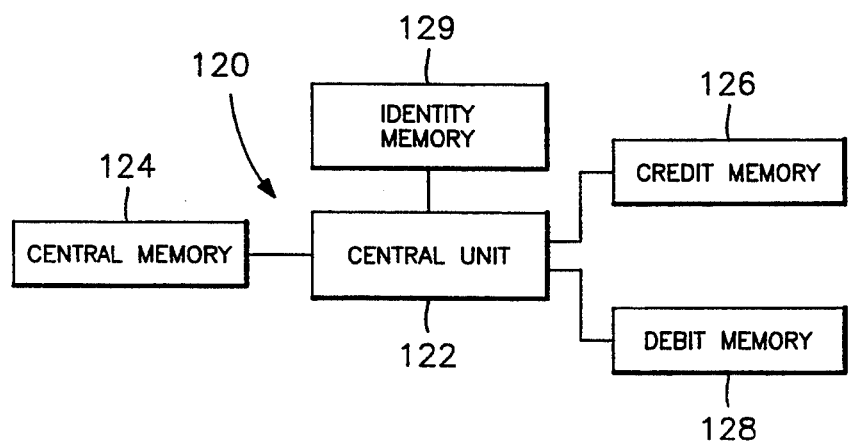
Figure 3:
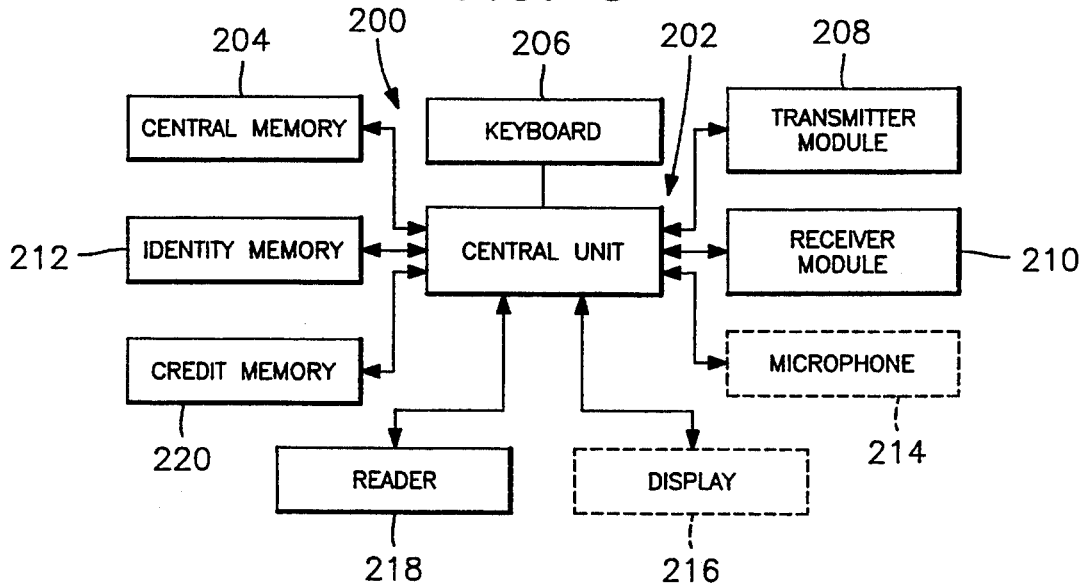
Figure 4A:
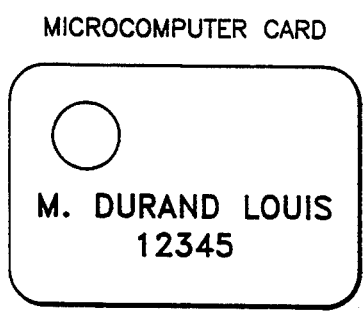
Figure 4B:
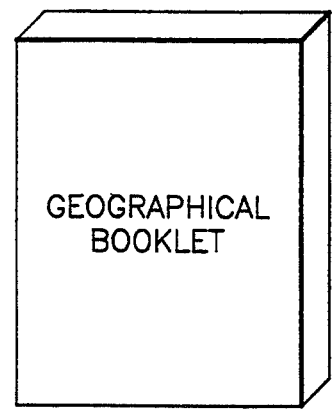
Figure 4C:
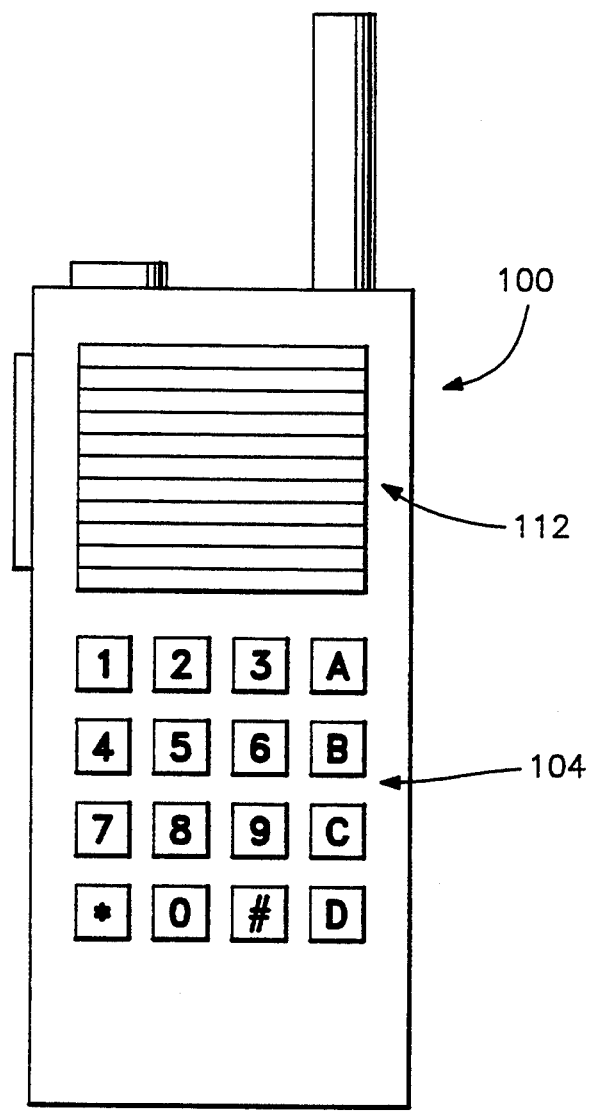
Figure 5:
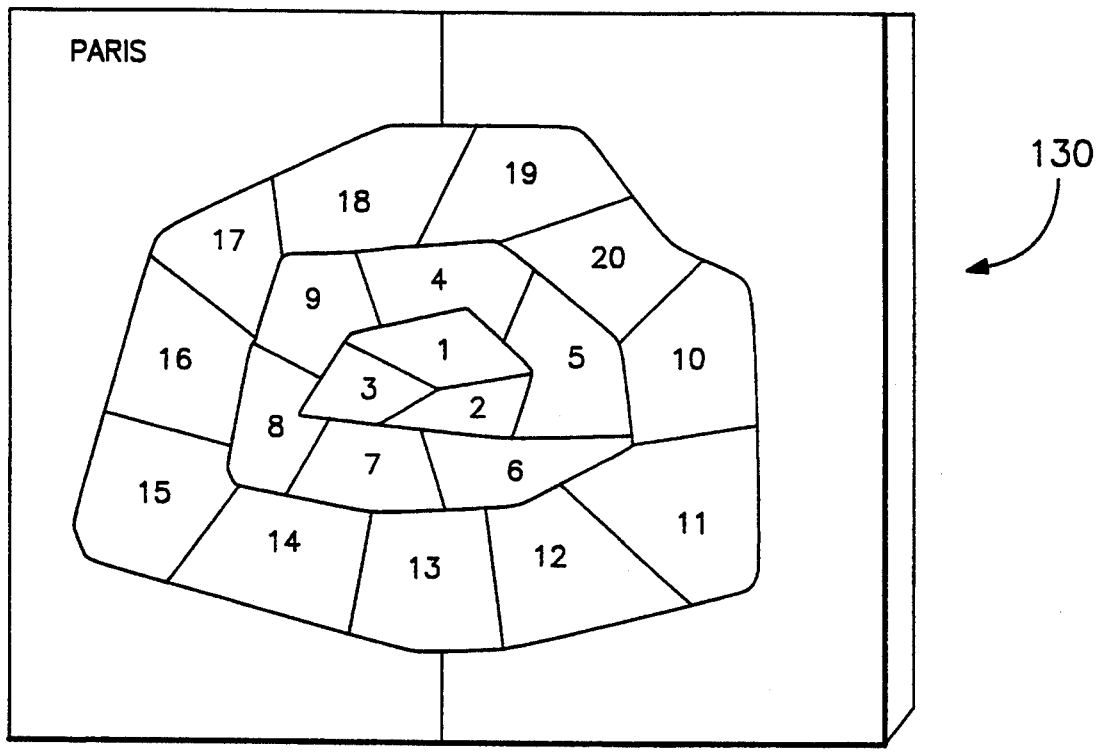
Figure 6A:
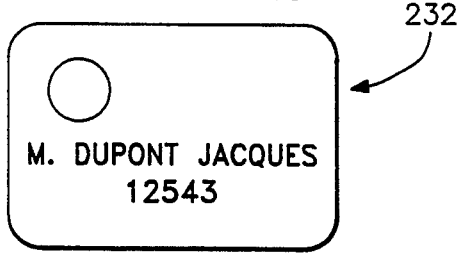
Figure 6B:
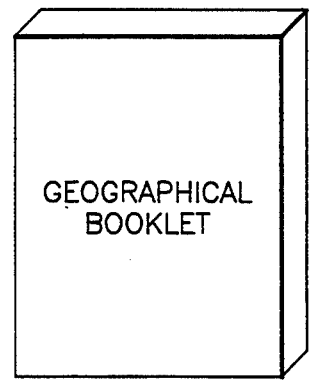
Figure 6C:
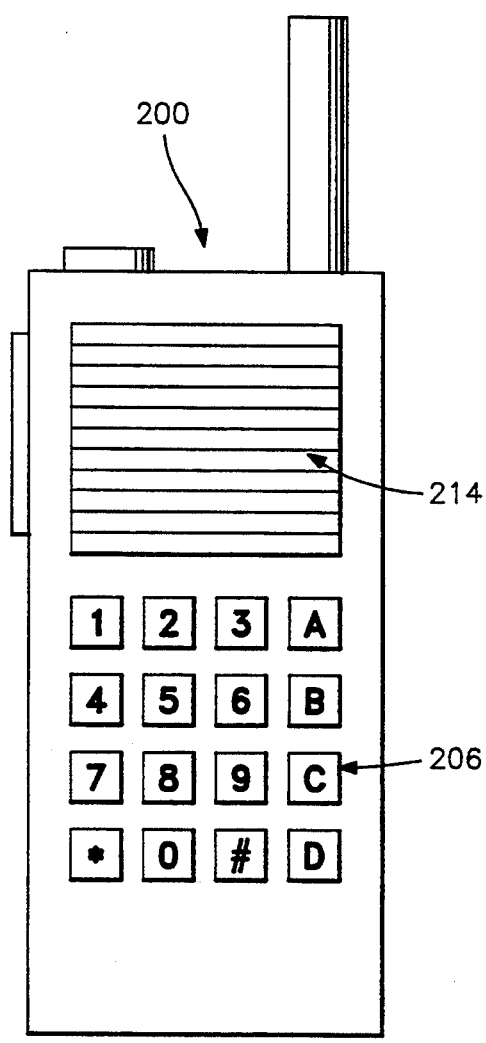
Figure 6D:
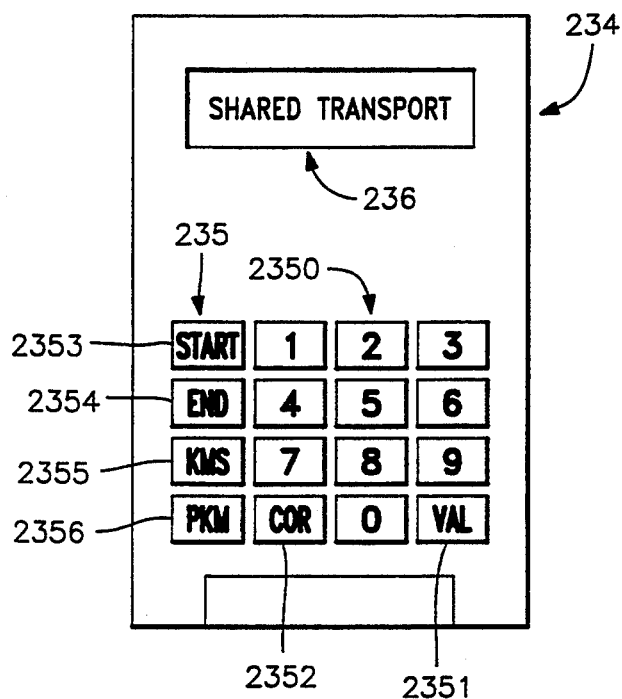

Other characteristics, objects and advantages of the present invention will appear on reading the detailed description which will follow, and with regard to the attached drawings, given by way of non-limiting examples and in which:

FIG. 1 represents a diagrammatic view, in the form of functional blocks, of a portable transmitter/receiver means in accordance with the present invention, FIG. 2 represents a diagrammatic view, in the form of functional blocks, of a memory medium for electronic payment in accordance with the present invention, FIG. 3 represents a diagrammatic view, in the form of functional blocks, of a transmitter/receiver means installed in vehicles, in accordance with the present invention, FIGS. 4A–4C represent diagrammatic view of the set of portable means made available to the pedestrians according to one preferential embodiment of the invention, FIG. 5 represents a diagrammatic view of a geographical booklet used in the context of this preferential exemplary embodiment.

FIGS. 6A–6D diagrammatically represent the whole of the means installed in vehicles in the context of the same overall preferential embodiment of the present invention, FIG. 7 illustrates the identification modes for locating the pedestrian transmitting the request signal, and FIGS. 8 to 15 represent functional flow charts of the system.

In the rest of the description, the portable means made available to the pedestrians will be called FOCUS 1, while the means installed in vehicles will be called FOCUS 2.

As indicated above, the two basic functions of the FOCUS 1 portable transmitter/receiver means carried by the pedestrians are to generate request signals which are representative of data relating to the trips wanted by the pedestrians and to detect a possible pick up offer signal emanating from the FOCUS 2 transmitter/receiver means installed in vehicles.

The basic functions of the FOCUS 2 transmitter/receiver means installed in vehicles are symmetrically to detect the request signals generated by FOCUS 1 portable transmitter/receiver means and to generate a pick up offer signal.

The portable transmitter/receiver means 100 represented in FIG. 1 comprise, in essence, a central unit 101 associated with a memory 102, a keyboard 104, a transmitter module 106 and a receiver module 108.

If needs be, the portable transmitter/receiver means 100 may further comprise a microphone 110 and display means 112.

The function of these various elements will be described in more detail below.

According to a preferential characteristic of the invention, the FOCUS 1 system made available to pedestrians comprises electronic payment means which comprise a memory medium 120 designed to be debited by appropriate means provided at the FOCUS 2 site. In essence, as represented in FIG. 2, the memory medium 120 used for the electronic payment comprises a central unit 122 associated with a central management memory 124, with a credit memory 126 and with a debit memory 128. If needs be, the memory medium 122 also comprises a memory 129 containing information for identification of the pedestrian.

The function of these various elements will be described in more detail below.

In essence, the transmitter/receiver means 200 of the FOCUS 2 system installed in vehicles comprise, as represented in FIG. 3, a central unit 202 associated with a central management memory 204, with a keyboard 206, with a transmitter module 208, and with a receiver module 210.

If needs be, the transmitter/receiver means 200 further comprise a memory 212 containing information for identification of the vehicle and/or of the vehicle driver, a microphone 214, display means 216, means 218 designed to read the memory medium 120 of the FOCUS 1 system, with a view to electronic payment and a credit memory 220.

The function of these various elements will be described in more detail below.

As previously indicated, one of the functions of the portable transmitter/receiver means 100 is to generate a request signal which is representative of data relating to the trips wanted by the pedestrians.

These data relating to the trips wanted by the pedestrians comprise, preferably, at least one of the following data: identification of the destination wanted, definition of the route wanted, identification of the direction wanted and location of the pedestrians transmitting the request signals.

These signals are generated by transmitter module 106, preferably in the form of an electromagnetic wave.

Still more precisely, the data relating to the trips wanted by the pedestrians are preferably coded. In the context of the invention, it is proposed to code these data by using a geographical booklet. These arrangements will be described below.

The data transmitted by the FOCUS 1 system may be inserted into the transmitter/receiver means 100 by virtue of the keyboard 104.

The request signal thus generated by the set of FOCUS 1 systems are received in the receiver modules 210 of the FOCUS 2 systems. In the event of a match between the data relating to the trip wanted by a pedestrian represented by a request signal received, and the trip being undertaken by a vehicle, the driver of the latter may instigate the transmission, by means of the transmitter module 208 of a pick up offer signal. This pick up offer signal may be initiated by acting on the keyboard 206.

The receiver module 108 of the FOCUS 1 system then receives the offer signal in return. The following phase of the process aims to define the precise pick up mode of the pedestrian by the vehicle, in particular as to specifying the pick up location.

This phase is preferably carried out in the form of a direct dialogue between the pedestrian and the driver of the vehicle by means of microphones 110, 214 and transmitter 106, 208 and receiver 108, 210 modules.

It is also possible to envisage this definition phase for the precise pick up modes being carried out not in the form of a direct dialogue but in the form of an exchange of coded data on the location of the pick up of the pedestrian by the vehicle and possibly as to the identity of the pedestrian as well as of the vehicle driver and/or of the vehicle.

These various exchanges can, if needs be, be facilitated by the display of geographical data and/or of the identities exchanged on the display means 112 and 216.

Preferably, when the vehicle has met up with the pedestrian, the process is followed by a step of exchanging and checking of the respective identities. In order to do that, preferably the respective identities of the pedestrian as well as of the driver and/or of the vehicle are stored in memory on memory media, such as memory cards. The information thus exchanged as to identity may be compared to a file in order to enhance the safety both of the pedestrians and of the vehicle drivers.

Memory storage is, preferably, also provided on the memory media held by the pedestrians on the one hand, and the vehicle drivers on the other hand, for the identities communicated by the other party, namely the vehicle drivers and the pedestrians respectively.

The same memory media may be used for payment by the pedestrian. Preferably, this payment is proportional to the distance covered.

According to a particular but not limiting embodiment, the portable FOCUS 1 system used by the pedestrians comprises three elements: a transmitter/receiver 100 such as shown diagrammatically in FIG. 1, a memory medium 120 such as that represented in FIG. 2, preferably formed by a microcomputer card and a geographical booklet 130 comprising geographical maps with codes relating to the partitioning of the latter, so as to facilitate the coding of data relating to the trips wanted by the pedestrians.

These three elements are represented diagrammatically in FIGS. 4A–4C. By way of a non-limiting example, the transmitter/receiver 100 may be of the IC-$\mu$ 4 A/AT/E type marketed by the ICOM Company. This transmitter/receiver 100 works in frequency modulation for example over the range 430/440 MHz.

The memory medium 120 may be formed by a microcomputer card such as the card proposed under reference CP8 by the BULL Company.

The FOCUS 2 system installed in vehicles preferably comprises four elements: the transmitter/receiver 200, a geographical booklet 230 similar to the geographical booklet 130 mentioned above, a memory medium 232 which may be of identical structure to the memory medium 120 mentioned above and a reader 234 designed to permit reading and writing for the memory media 120 and 232.

These four elements are represented diagrammatically in FIGS. 6A–6D.

By way of a non-limiting example, the transmitter/receiver 200 may here again be formed by the device marketed by the ICOM Company under reference IC-$\mu$ 4 A/AT/E. The memory medium 232 may be formed by a microcomputer card marketed by the BULL Company under reference CP8. Finally, also by way of a non-limiting example, the reader 234 may be formed by a reader marketed by the BULL Company under reference CAD.

The range of the transmitter/receiver means 100, 200 is preferably adjustable. By way of example, the range of the transmitter/receiver means 100 and 200 may be adjusted between a few hundreds of meters and several kilometers. This characteristic is in particular offered by the ICOM IC-$\mu$A/AT/E transmitter/receivers mentioned above.

The range of the transmitter/receivers is defined on the basis of the concentration of vehicles in the place in question.

For a built-up area with a high concentration of vehicles it is necessary to adjust the range of the transmitter/receiver to 1 km for example. For a built-up area with a low concentration of vehicles it is, in contrast, desirable to increase the range of the transmitter/receiver. A larger number of carriers may then receive the shared route request transmitted by the pedestrian.

As previously indicated, the cards 120 and 232 make it possible to exchange and to check the identities of the pedestrians, of the vehicle drivers and of the vehicles and to carry out all the payment operations. According to one particular embodiment, the card comprises, on its face, the identity of its owner, namely his name, and his forename, as well as a code number. Moreover, the card comprises, in a security area, the identity of the owner of the card. In the case of a card held by a vehicle driver, the card 232 further contains information relating to the identity of the vehicle, for example the number of the latter's grey card.

The cards 120, 232 preferably contain a security file comprising the list of stolen cards. In this case, for safety measures, the card owners have to periodically visit a central office for an update of this file. That also implies that every owner of a transport card must, in the event of theft, make the central office aware of it as soon as possible.

The cards 120, 232 further comprise an account file comprising two sub-files: a credit file and a debit file.

The credit file 126 contains the up-to-date credit and, for each credit operation, the main particulars, for example the identity of the pedestrian debited.

The debit file 128 contains the up-to-date debit and, for each debit operation, the main particulars, for example the identification number, such as the grey card number, of the vehicle credited.

The geographical booklet 130 and 230 comprises geographical cards divided up by region and large built-up areas. For example, the city of Paris may be partitioned into twenty parts corresponding to the twenty districts of the city.

Such a card is represented diagrammatically in FIG. 5.

The reader 234, such as the CAD reader from the BULL Company permits reading and writing of the microcomputer cards 120, 232. The reader 234 is preferably portable, stand-alone and intelligent with communication capability and integrated input and display means.

The input means 235 of the reader 234 comprises, for example, sixteen keys: a numerical block 2350 of ten keys, a validation key 2351, a correction key 2352 and four function keys: a key for start of use of the reader 2353, a key for end of use 2354, a key for input of the kilometrage of the vehicle 2355, referenced KMS in FIG. 6 and a key for input of the price per shared kilometer 2356 referenced PKM in FIG. 6.

The display 236 comprises two lines of sixteen LCD alphanumeric characters making it possible to display the data inserted by the driver so that he can either check if any input error has been committed or correct if an input error has been committed.

An example of a process employed in the context of the invention will now be described with respect to the attached FIGS. 4 to 15.

The process employed with the use of the FOCUS 1 and FOCUS 2 systems proposed in the context of the invention comprises two main steps: 1) a step of matching the request emanating from a pedestrian and the offer emanating from a driver first of all, then 2) a transport step.

1) MATCHING THE REQUEST AND THE OFFER

1.1.) The Shared Route Request

In order to make his shared route request, a pedestrian uses part of the FOCUS 1 system, namely: the transmitter/receiver 100 and the geographical booklet 130. The pedestrian consults his geographical booklet 130 so as to find out the code of his destination.

By way of example and with reference to FIG. 7, a pedestrian may be envisaged situated at the point of departure having 23 as its code on the geographical booklet and wishing to move to the destination point having 33 as its code. After identification of the destination code 33 in the geographical booklet 130, the pedestrian inputs the number 33 on the keyboard 104 of his transmitter/receiver 100. He then presses the validation key of the transmitter/receiver 100. The latter thus transmits on a defined frequence F33. An appropriate audible signal, for example of the repetitive bleep type, is then received in all the vehicles equipped with the FOCUS 2 system and having selected, in the same way, the same destination code, on condition that these vehicles are situated in the range radius of the transmitter/receiver 100 in question.

1.2.) The Shared Transport Offer

In order to make his shared transport offer, the driver uses part of the FOCUS 2 system, namely: the transmitter/receiver 200 and the geographical booklet 230. The driver consults his geographical booklet 230 so as to find out the code of his destination. For example, by reference to FIG. 7, it is possible to envisage the case of a vehicle driver situated at the departure point having 19 as its code and wishing to move to the destination point having 33 as its code. The driver inputs the number 33 at the keyboard 206 of his transmitter/receiver 200. He next presses the standby key of the transmitter/receiver. The latter thus receives, on the frequency coded F33, all the requests for the same destination. When a call is made by a pedestrian, the FOCUS 2 transmitter/receiver 200 delivers an audible signal warning the driver, as indicated previously. The latter actuates the validation key of his transmitter/receiver and is thus in communication with the requesting pedestrian. The two speakers may conduct a dialogue by virtue of the microphones 110, 214 and decide, if both parties are in agreement, on the precise meeting place.

By way of example, during this phase, the pedestrian may state his identity and the driver announce his licence plate number, this being done, on the one hand, to allow the pedestrian to unequivocally recognize the vehicle, and on the other hand, for the driver to recognize the pedestrian during subsequent presentation of his transport card.

2) TRANSPORT PHASE

The pedestrian must indicate his position to the driver so that the latter comes to meet him, if identification of the location of the pedestrian is not exchanged in coded form by means of the keyboard 104 and of the transmitter module 106.

Preferably, when the vehicle has met up with the pedestrian, before the driver of the vehicle opens his windows and doors, the pedestrian must show the driver his transport card 120 in order to permit the driver to read the identity of the pedestrian so as to check that it accords with the prior radio communication and on the other hand to read the code from the card.

These arrangements permit the driver to remain in safety. Subsequently, the transport step breaks down into several sub-phases, preferably eight sub-phases: 1) a recognition sub-phase represented in FIG. 8, 2) a credit test sub-phase represented in FIG. 9, 3) a kilometric fare agreement sub-phase represented in FIG. 10, 4) an initialization of the kilometrage sub-phase represented in FIG. 11, 5) a sub-phase of definition of the kilometrage on arrival represented in FIG. 12, 6) a sub-phase of calculation of the cost of the shared transport represented in FIG. 13, 7) a sub-phase of debiting the pedestrian card 120 represented in FIG. 14, and 8) a sub-phase of crediting the driver's card 232 represented in FIG. 5.

Figure 8:
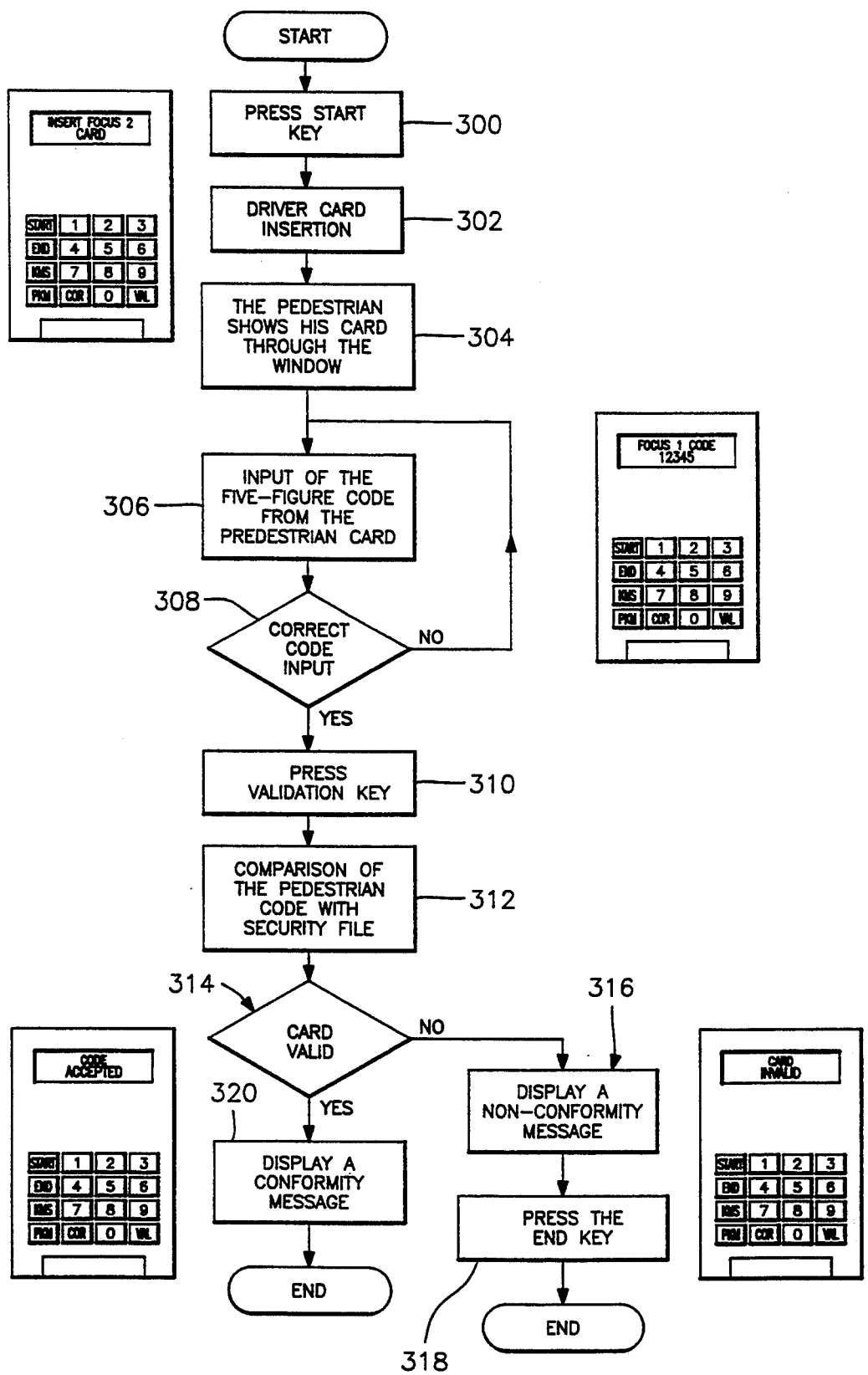

2.1.) Sub-phase A: Recognition (FIG. 8)

For this sub-phase the driver uses another part of the FOCUS 2 system: the card reader 234. He presses on the start key (step 300). He inserts his card 232 into the reader (234) (step 302). The pedestrian having shown his card at step 304 in order to permit the conductor to read the code, for example a five-figure code, of the pedestrian card 120, the driver inputs this code at step 306. The driver next checks the code thus input at step 308. If no input error has been committed he validates via the validation key at step 310. Otherwise he presses on the correction key and again inputs the code of the pedestrian at step 306. He next validates via the validation key at step 310.

Next, at step 312, the reader 234 will search for the security file present on the card of the driver 232 and will compare the code with the pedestrian with the set of codes from the security file. If it results from the interrogation of step 314 that the card of the pedestrian is not valid, the reader displays a non-conformity message at step 316. The driver may signal to the pedestrian his refusal of the shared transport and put an end to the process by pressing on the end key at step 318. If, on the contrary, the card 120 of the pedestrian is recognized as valid, the reader 234 displays a conformity message at step 230. The driver may then signal to the pedestrian his agreement to the shared transport and invite the pedestrian to enter the vehicle.

Figure 9:
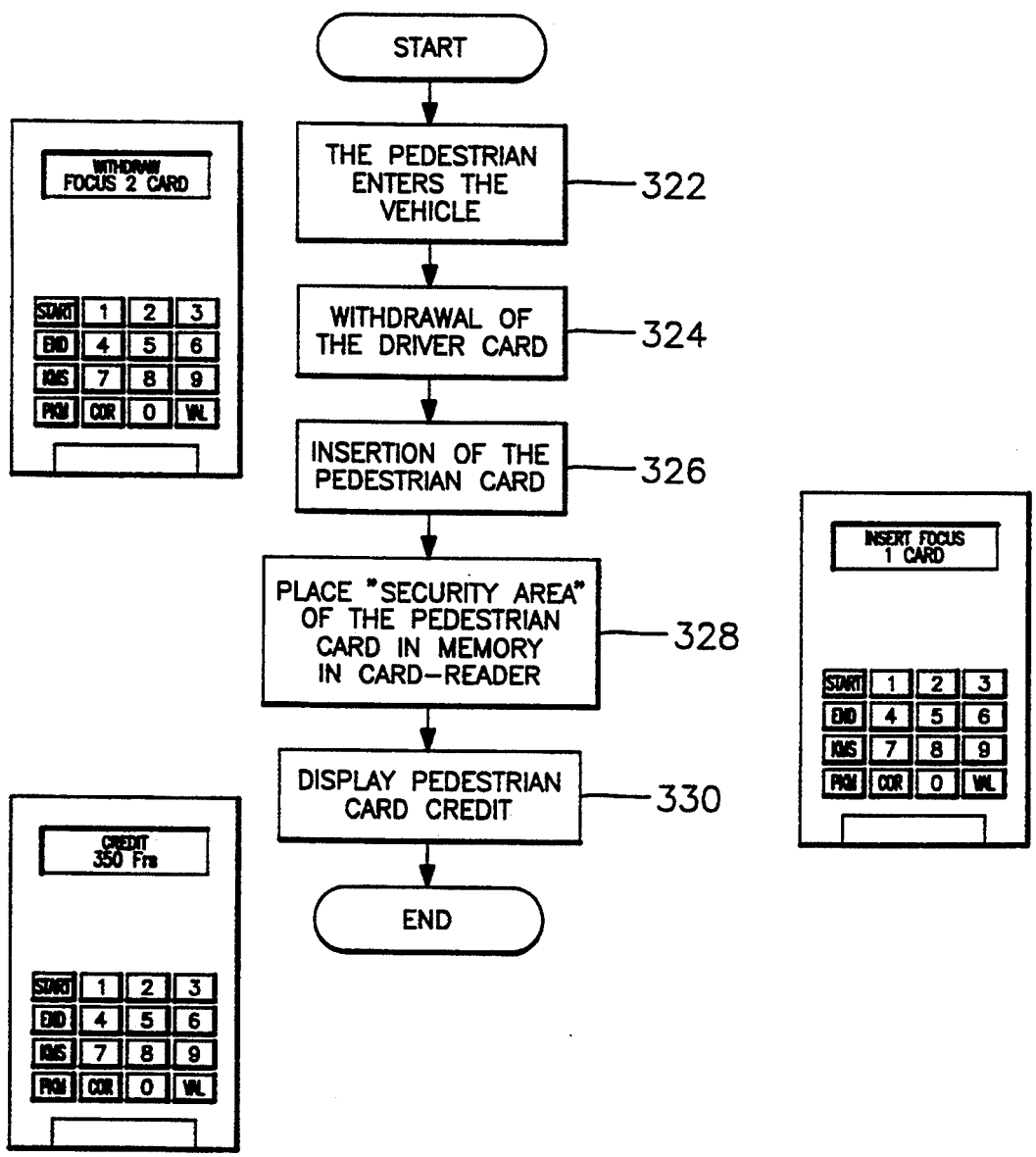

2.2.) Sub-phase B: Credit Test (FIG. 9)

When the pedestrian enters the vehicle at step 322, the driver withdraws his card 232 from the reader 234 at step 324. The pedestrian is then invited to insert his card 120 into the reader 234 at step 326. The reader 234 can then register the contents of the security area of the card of the pedestrian 120 at step 328.

The reader 234 at step 330 loads the credit file from the card of the pedestrian 120 and displays the total of the credit available on the display screen 236 of the reader.

Figure 10:
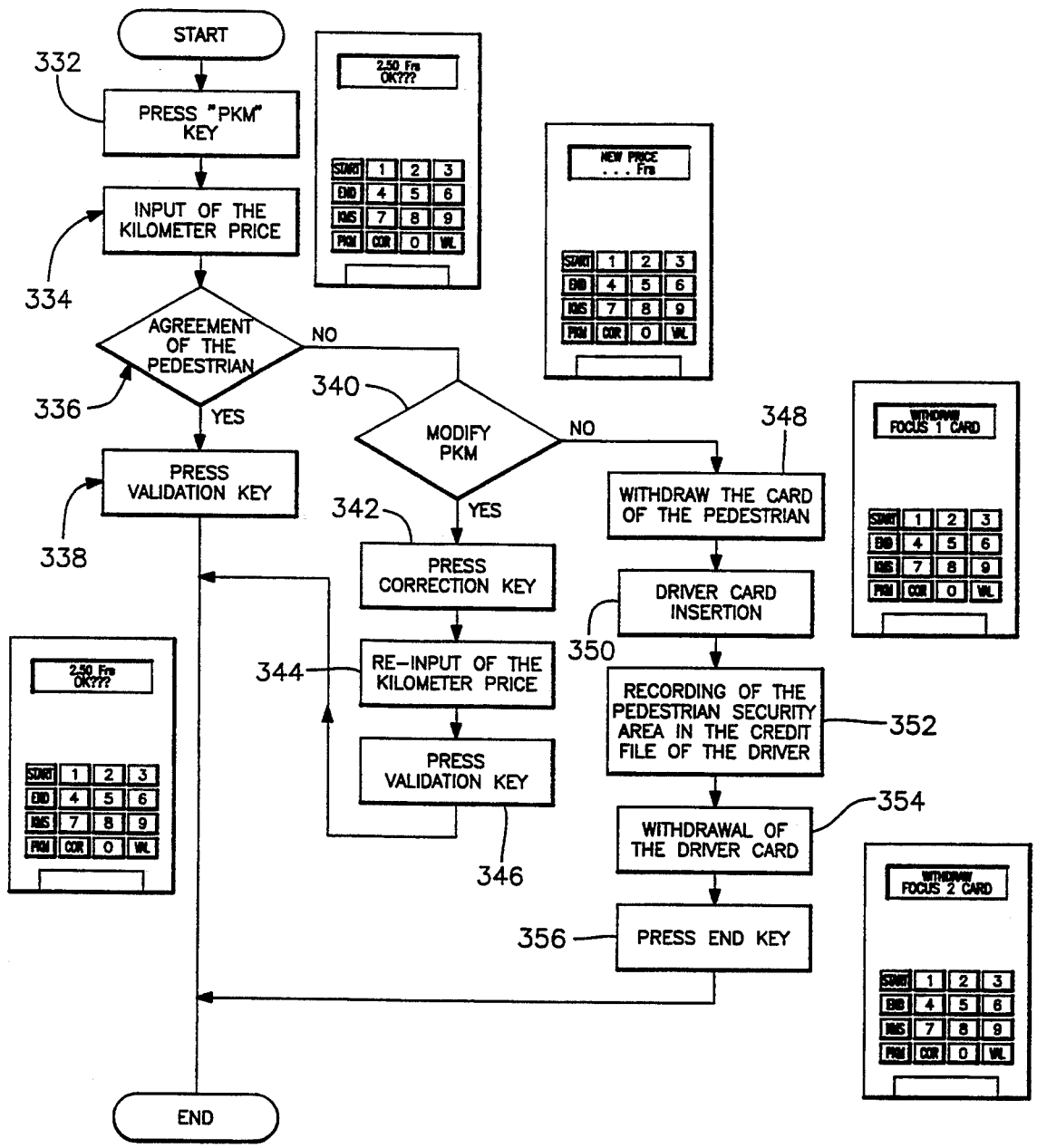

2.3.) Sub-phase C: Kilometric Rate Agreement (FIG. 10)

The driver may judge, on the basis of the kilometrage anticipated to reach the destination, whether the credit is sufficient.

The driver then presses on the PKM key, at step 332, in order to indicate to the pedestrian the price of the shared kilometer. The reader displays this price on the display 236. The driver is at liberty to fix this price but he may also agree a price with the pedestrian, as he may very well offer him the shared transport free of charge.

In the first case, after the call step 332 followed by step 334 of display of the kilometric price and step 336 of interrogation of the pedestrian, step 338 is reached in the course of which the pedestrian or the driver presses the validation key.

In the second case, in which the pedestrian does not agree on the price, breaks down into two sub-steps according to whether the price may be modified or not (step 340).

If the price may be modified, the driver presses the correction key at step 342 and inputs at the keyboard the price of the kilometer at step 344 before pressing the validation key 346. It can be anticipated that if the pedestrian makes his payment in another currency, the driver presses on the correction key as many times as is necessary in order to cause the desired currency to appear on the display screen. The card reader 234 may be programmed without difficulty for this purpose by specialists in the subject.

When it turns out at step 340 that the price per kilometer cannot be modified, the pedestrian withdraws his card 120 at step 348. The driver then inserts his card at step 350 so that the reader 234 proceeds, at step 352, with registering the security area of the pedestrian card 130 in the credit file of the card 232 of the driver. Next, the driver withdraws his card, step 354 and presses the end key at step 356.

Figure 11:
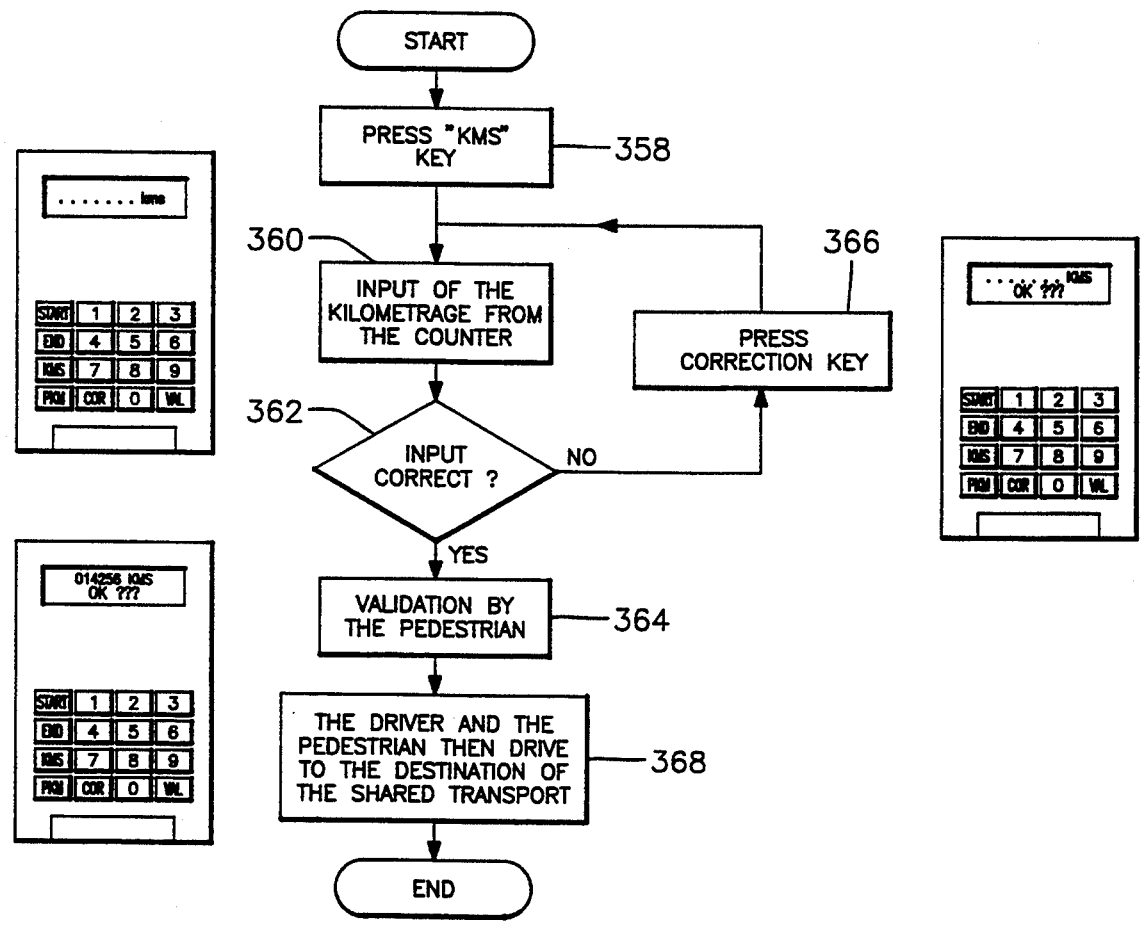

2.4.) Sub-phase D: Departure Kilometrage (FIG. 11)

If the total of the credit in the pedestrian card 120 is sufficient, the following phase can be embarked upon. The driver then presses the KMS key at step 358 and he inputs, at the numerical keyboard, the current kilometrage of his vehicle at step 360. If no input error is traced at step 362, the pedestrian validates via the validation key at step 364. Otherwise the driver presses the correction key at step 366 and again inputs the kilometrage of the vehicle at 360. The pedestrian next validates via the validation key step 364 [sic]. The shared route may then commence at step 368.

Figure 12:
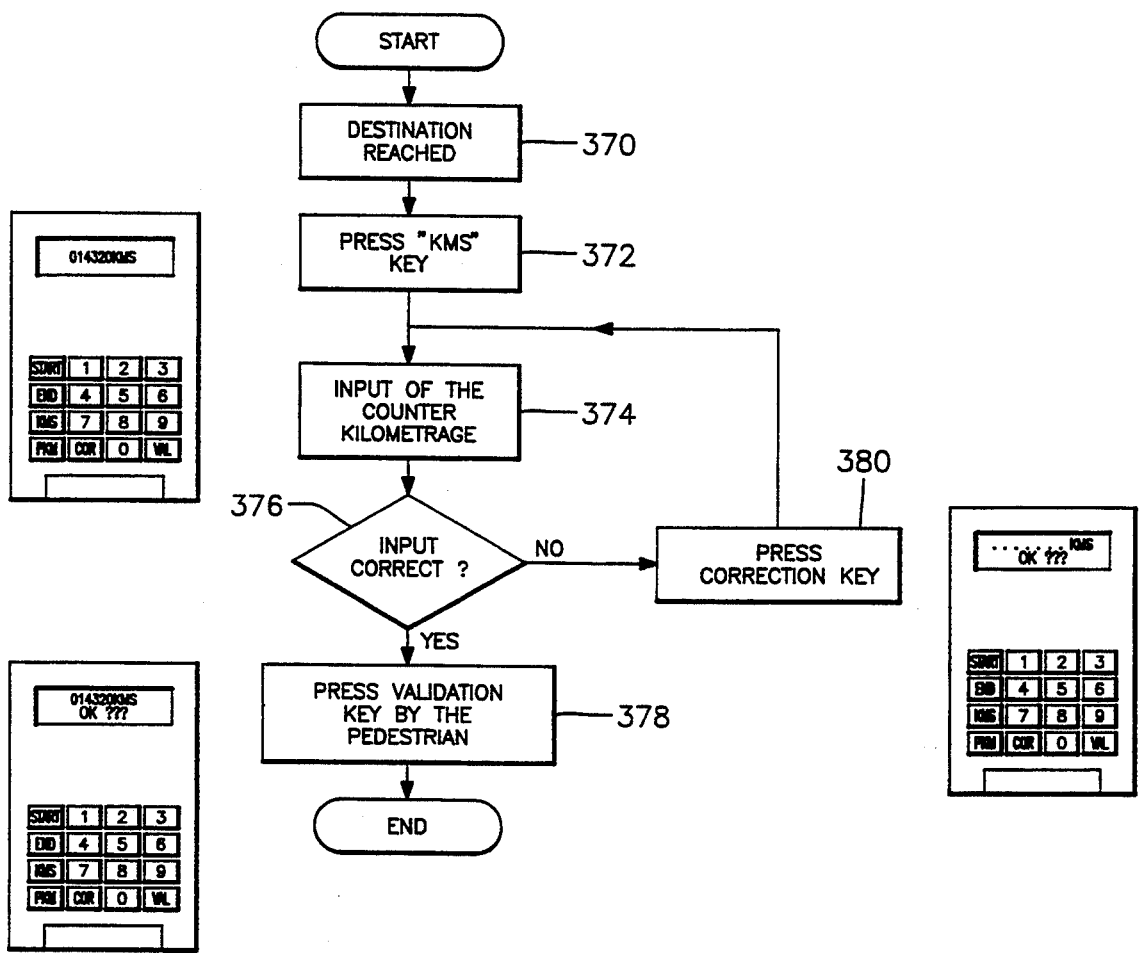

2.5.) Sub-phase E: Arrival Kilometrage (FIG. 12)

When the destination is reached at step 370, the driver presses the KMS key at step 372 and inputs at the numerical keyboard the current kilometrage of his vehicle at step 374. If no input error is detected at step 376, the pedestrian validates via the validation key 378. Otherwise the driver presses on the correction key at step 380 and again inputs the kilometrage of his vehicle at step 374. The pedestrian next validates via the validation key at step 378.

Figure 13:
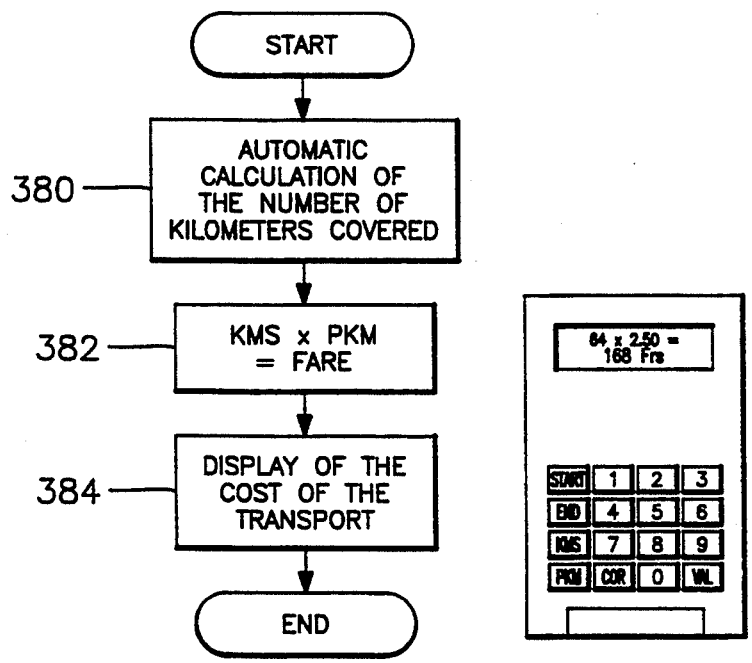

2.6.) Sub-phase F: Cost of the Shared Transport (FIG. 13)

At step 380, the reader 234 calculates the number of kilometers covered. It preferably displays this result. The reader next carries out, at step 382, calculation of the price of the shared transport and displays this price at step 384

Figure 14:
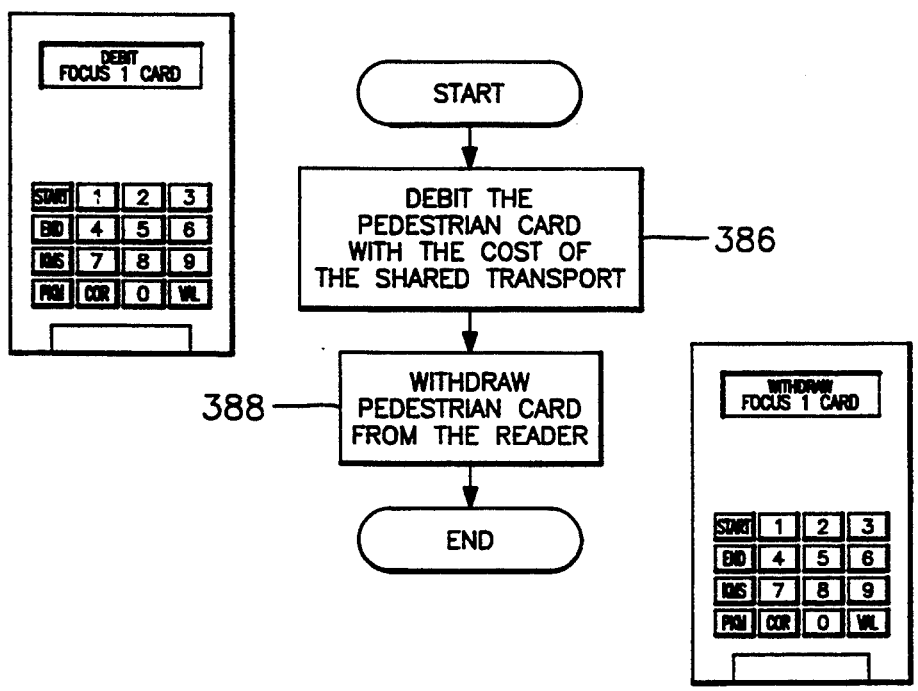

2.7.) Sub-phase G: Debit Pedestrian Card (FIG. 14).

In order to permit access to the debit file of the card of the pedestrian the driver presses the validation key at step 386. The card 120 of the pedestrian is then debited by the amount of the transport. The pedestrian may then withdraw his card from the reader and exit the vehicle at step 388.

2.8.) Sub-phase H: Credit Driver Card (FIG. 15)

Figure 15:
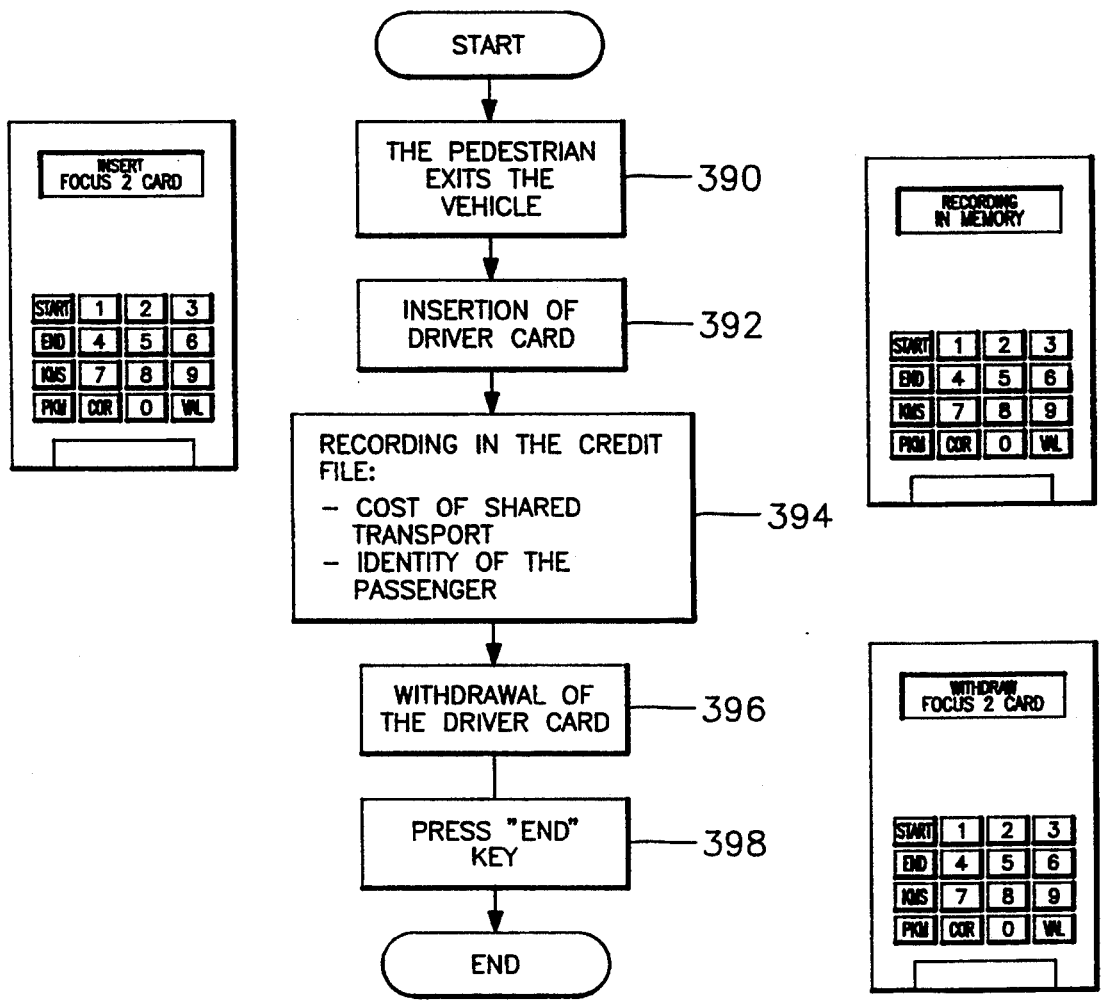

The exit of the pedestrian is illustrated diagrammatically under reference 390 in FIG. 15. The driver may then insert his card at step 392 and press the validation key. The reader will load into the credit file the identity of the pedestrian and the total of the shared transport at step 394.

The driver may then withdraw his card at step 396 and press on the end key at step 398. The reader 234 may be programmed without difficulty by specialists so that in the case where the driver has pressed the end key before having inserted his card, the reader addresses a message to remind him that he has to insert his card in order to complete the operation.

The previously described system permits permanent, in situ, matching of requests and punctual offers of financially shared routes, likely to arise unexpectedly at any arbitrary point over all motor vehicle traffic routes.

It particularly permits permanent sharing of the distances habitually covered by a multitude of people alone in their vehicle. The invention applies to any type of vehicle, but particularly to private vehicles.

The invention permits immediate matching of the requests and of the offers. It further permits total safety to be ensured both for the pedestrians carried and for the carrying drivers, on the one hand by virtue of identification of each other and the memory storage of these identifications, on the other hand by virtue of the electronic payment proposed which avoids both the pedestrians carried and the carrying drivers having hard cash about their persons.

The cards 120, 232 may be sold in automatic distributors or accredited retailers. They can come complete or not with codes having to be checked before their use.

Needless to say the present invention is not limited to the particular embodiments which have just been described but extend to all variants in accordance with its spirit.

The display means 112, 216 provided on the transmitter/receiver means 100, 200 may be provided to display the destination requested by the pedestrian and/or the location of the pedestrian and/or of the vehicle as well as, if needs be, the identity of the pedestrian and of the vehicle.

The display means 112, 216 may be formed by a extra flat, light and pliable display screen, for example based on LCD technology.

In the preceding example, the data item relating to the trips wanted by the pedestrians is defined with the use of the geographical booklet and constituted by the destination wanted. If needs be, as indicated previously, the data item relating to the trips wanted, the item being carried by the request signal may correspond only to the direction of travel wanted by the pedestrian.

The reader 234 may be designed to recognize and convert different currencies, display their conversion rates, memorize and allow digital modification of the memorized rates.

The reader 234 may be programmed in order to continuously display the remaining distance available to the passenger and send out a signal in anticipation of the available balance being exhausted. In order to do that, the reader 234 has to be coupled to an odometer measuring the distance covered by the vehicle. Similarly, the reader 234 may be programmed to continuously display the value of the route as it progresses.

The system may be designed to allow more than one passenger with or without a financial share in the distances jointly covered.

The driver can obtain payment for the value contained in the credit memory of his card 232 from central bodies supplying these cards. Preferably, the reader 234 is designed to signal the load limit of this memory location, before overload, with a view to its being replaced by the driver.

In order to enhance the safety of the driver, it is possible to provide an auxiliary card reader outside the vehicle, for example at the site of a rear view mirror, in order to permit the driver to check the identity of the pedestrian and the validity of his card 120, before authorizing the pedestrian to get into the vehicle.

If needs be, the identification data for security and payment may be provided on two separate cards.

The cards 120, 232 may be easily adapted to serve both for a pedestrian and for a vehicle driver.

The card reader 234 may also be programmed to interrupt the debit of the card 120 after covering a predetermined distance X.

The geographical booklet 230 may, if needs be, be replaced by a radiogoniometric system. A radio compass then permits the axis between the vehicle and the pedestrian to be known. A distance-measuring system coupled to the radio compass then permits the distance which separates the vehicle from the pedestrian to be known. The driver thus receives the information coming from the equipment of the pedestrian, either visually on a screen inside the vehicle, or by an audible signal indicating the angle between the axis of movement of the vehicle and the position of the pedestrian as well as the distance separating them.

The FOCUS 2 system may be equipped with an optical reading system for reading the code from the pedestrian card 120.

The invention applies in a non-limiting way to private vehicles.

Needless to say, the present invention may form the subject of numerous embodiment variants.

As far as the geographical route maps used are concerned, it is possible, for example, to anticipate the following arrangements.

Each transmitter-receiver is endowed with a memory which is loadable from geographical maps with a microcomputer.

These geographical maps contain a grid pattern of coded itineries in cities or in regions; they supply to the transmitter-receiver, with which they are associated, the transmission frequencies corresponding to the itineries sought, as well as the location of the pedestrian (as an accessory to the motor vehicle).

The transmitter-receiver transposes into transmission-reception frequencies the code numbers of the destinations, displayed by each of the participants in the read window of their transmitter-receiver.

If the user knows the designation of his destination point without knowing its code, he calls it up via the keyboard of his transmitter-receiver in the read window and validates it. Otherwise the pedestrian consults an associated geographical booklet so as to find out the name or the code of his destination, as for that of his own proposal.

The geographical maps of digitized trips may be divided up by regions and/or large built-up areas.

The location of the pedestrian and thus the effectiveness of the matching are optimized by the fineness of the geographical grid pattern, which can be given concrete, visible form via marker posts locating the pedestrian by the number of the post.

This fineness correspondingly increases the potential for shareable routes.

As far as the location of the pedestrian is concerned, it is possible to anticipate the following arrangements.

It has previously been anticipated that upon the audible signal of the call from a pedestrian, which the FOCUS 2 transmitter-receiver delivers to the driver, the latter presses on the validation key of his transmitter-receiver and is thus in communication with the requesting pedestrian. The two speakers carry on a dialogue and decide, if both parties agree, on the meeting point. The pedestrian states his numerical identity, the driver announces the details of his licence plate, this permitting the pedestrian, on the one hand, to unequivocally recognize the vehicle, and the driver, on the other hand, to recognize the pedestrian during subsequent presentation of his identification card.

Locating the pedestrian can thus be brought about by radio dialogue but this locating can turn out to be negative for the vehicle placed down-route from the pedestrian. A wasteful dispersion of offers as of requests ensues.

In order to alleviate this dispersion, the driver successively tunes to a down-route coded frequency i.e. 33.23, the driver knowing that 23 is down-route from his own position. He will thus detect any downstream pedestrian transmitting on the same frequency composed of his destination 33 and of his pedestrian position.

The driver, in order to be more sure of reaching down-route, will use a down-route margin.

EXAMPLE

A driver in position 21 going towards 23 turning to f33.23 will eliminate the pedestrians in position 22 as well as, for the moment, the pedestrians down-route from position 23. This should not prevent this driver from then successively tuning to f33.24, f33.25, etc . . . eliminating, in this way, dispersion of requests and optimizing the effectiveness of the matching, also related to the fineness of the geographical grid lines.

I claim:

1. System for communication between pedestrians and vehicles, intended to make contact between pedestrians desiring to go to a given destination and vehicles capable of transporting pedestrians to the destinations, said system comprising:
    portable transmitter/receiver means to be carried by the pedestrians for generating a request signal, the request signal comprising codes representing the destination desired by the pedestrians and the location of the pedestrians transmitting the request signals, and said portable transmitter/receiver means capable of automatically detecting a pick up offer signal emanating from a vehicle, and
    vehicle transmitter/receiver means installed in vehicles for detecting the request signals generated by the portable transmitter/receiver means whose code coincides with a specific code relating to the trip of the associated vehicle, and in response for generating a pick up offer signal for transmission to the transmitter/receiver means which sent the coinciding request signal.

2. Communication system according to claim 1, wherein said codes represent the definition of the route wanted.

3. Communication system according to claim 1, wherein said codes represent the identification of the direction wanted.

4. Communication system according to claim 1, wherein the portable transmitter/receiver means and the vehicle transmitter/receiver means each comprises means for communicating vehicle between the pedestrians transmitting the request signals and the drivers of the vehicles transmitting the offer signals.

5. Communication system according to claim 1, further comprising means for identifying the pedestrians.

6. Communication system according to claim 1, further comprising means for identifying the vehicles and their drivers.

7. Communication system according to claim 1, and further comprising electronic payment means for automating the payment by the pedestrian for the transport provided by the vehicle.

8. Communication system according to claim 7, wherein the electronic payment means comprises a memory medium each held by a pedestrian and reading means installed in the vehicles for reading the memory medium.

9. Communication system according to claim 8, wherein the memory medium (120) comprises a microcomputer card.

10. Communication system according to claim 1, and further comprising a geographical booklet illustrating geographical regions which are divided into zones and are assigned to predetermined codes which are transmitted by the portable transmitter/receiver means.

11. Communication system according to claim 1, and further comprising memory media carried by the pedestrians and the vehicle drivers, said memory media containing identification data for identifying the pedestrian and vehicle drivers and for storing the identification data of the vehicle driver or pedestrian.

12. Communication system according to claim 1, wherein the transmitter/receiver means comprises display means for displaying said codes transmitted in the request signals.

13. The system according to claim 1, wherein each vehicle unit comprises calculating means for calculating the cost of transport by multiplying by a basic rate the distance travelled as determined by an odometer connected to the calculation means.

14. The system according to claim 13, and further comprising a debit memory medium and a credit memory medium carried by a vehicle driver, and wherein the calculating means debits the debit memory medium and credits the credit memory medium.

15. A system for establishing communication between pedestrians desiring transportation to a destination and vehicles for transporting the pedestrians to their destinations, the system comprising:
    a plurality of portable units each carried by a pedestrian desiring transportation to a destination, each of said portable units comprising:
        transmitter/receiver means for generating request signals including codes representing the destination desired by the pedestrian and the location of the pedestrian transmitting the request signals, and for automatically detecting a pick up offer signal emanating from a vehicle;
        a pedestrian microcomputer card; and
        a pedestrian geographical booklet; and
    a plurality of vehicle units each associated with a vehicle, each vehicle unit comprising:
        transmitter/receiver means installed in each vehicle for detecting the request signals generated by the portable transmitter/receiver means whose code coincides with a specific code relating to the destination of the vehicle, and in response for generating a pick up offer signal;
        a vehicle microcomputer card;
        a vehicle geographical booklet; and
        a card reader for reading the vehicle microcomputer card and the pedestrian microcomputer card.

16. The system according to claim 15, wherein the vehicle and pedestrian geographical booklets comprise geographical maps having codes assigned to geographical regions and the portable units each further comprising a keyboard for entering a code to be transmitted by the associated portable transmitter/receiver means.

* * * * *

UNITED STATES PATENT AND TRADEMARK OFFICE
CERTIFICATE OF CORRECTION

PATENT NO.  : 5,337,046
DATED       : August 9, 1994
INVENTOR(S) : Michel GRASSET It is certified that error appears in the above-identified patent and that said Letters Patent is hereby corrected as shown below:

Title Page, Item [87] should read as follows:
[87] PCT Pub. No.: WO91/13420

PCT Pub. Date: Sept. 5, 1991

Signed and Sealed this

Seventh Day of February, 1995

Attest:

BRUCE LEHMAN

Attesting Officer    Commissioner of Patents and Trademarks